US012507046B2

United States Patent
Ling et al.

(10) Patent No.: US 12,507,046 B2
(45) Date of Patent: Dec. 23, 2025

(54) PASSENGER SUPPORT SYSTEM

(71) Applicant: Motional AD LLC, Boston, MA (US)

(72) Inventors: Felice Ling, Cambridge, MA (US);
Linh Pham, Cambridge, MA (US);
Moira Doherty, Boston, MA (US)

(73) Assignee: Motional AD LLC, Boston, MA (US)

( * ) Notice: Subject to any disclaimer, the term of this patent is extended or adjusted under 35 U.S.C. 154(b) by 513 days.

(21) Appl. No.: 17/730,870

(22) Filed: Apr. 27, 2022

(65) Prior Publication Data

US 2022/0345861 A1 Oct. 27, 2022

Related U.S. Application Data

(60) Provisional application No. 63/180,396, filed on Apr. 27, 2021.

(51) Int. Cl.
| | |
|---|---|
| *H04W 4/42* | (2018.01) |
| *B60R 25/01* | (2013.01) |
| *B60R 25/31* | (2013.01) |
| *G08G 1/00* | (2006.01) |
| *G08G 1/01* | (2006.01) |
| *H04W 4/90* | (2018.01) |

(52) U.S. Cl.
CPC ............ *H04W 4/42* (2018.02); *B60R 25/01* (2013.01); *B60R 25/31* (2013.01); *G08G 1/0129* (2013.01); *G08G 1/205* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 2017/0080900 A1* | 3/2017 | Huennekens | G05D 1/0088 |
| 2018/0211541 A1* | 7/2018 | Rakah | G06Q 10/0631 |
| 2018/0364704 A1 | 12/2018 | Liu et al. | |
| 2019/0265703 A1 | 8/2019 | Hicok et al. | |
| 2019/0361444 A1* | 11/2019 | Herbach | G06T 11/60 |
| 2020/0010051 A1* | 1/2020 | Dumov | H04W 4/48 |
| 2020/0143181 A1* | 5/2020 | Moniot | G06V 10/764 |
| 2020/0193368 A1 | 6/2020 | Bhatia et al. | |

FOREIGN PATENT DOCUMENTS

| | | |
|---|---|---|
| KR | 10-2019-0106845 A | 9/2019 |
| WO | WO 2017/079229 | 5/2017 |

OTHER PUBLICATIONS

International Preliminary Report on Patentability in International Appln. No. PCT/US2022/026570, dated Nov. 9, 2023, 8 pages.

(Continued)

*Primary Examiner* — Adolf Dsouza
(74) *Attorney, Agent, or Firm* — Fish & Richardson P.C.

(57) ABSTRACT

Among other things, techniques are described for a passenger support system. In an example, a reported number of passengers associated with on-demand mobility transportation services is obtained in response to passengers opting-in to a passenger support system. The reported number of passengers is compared with a vehicle detected number of passengers. In response to the reported number of passengers being unequal to the vehicle detected number of passengers, a remote customer assistant is enabled.

18 Claims, 15 Drawing Sheets

(56) References Cited

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

Goto et al., "A new passenger support system for public transport using mobile database access," VLDB'02: Proceedings of the 28th International Conference on Very Large Databases, Hong Kong SAR, China, Aug. 20-23, 2002, pp. 908-919.

International Search Report and Written Opinion in International Appln. No. PCT/US2022/026570, dated Sep. 30, 2022, 10 pages.

Extended European Search Report in European Appln. No. 22796657.9, mailed on Nov. 18, 2024, 8 pages.

\* cited by examiner

PASSENGER SUPPORT SYSTEM

CROSS-REFERENCE TO RELATED APPLICATION

This application claims the benefit of U.S. Provisional Application No. 63/180,396 filed on Apr. 27, 2021, which is incorporated by reference herein in its entirety.

FIELD OF THE INVENTION

The present techniques relate to vehicle passenger services, including the security of persons and property.

BACKGROUND

An autonomous vehicle (AV) can operate without human intervention. For example, an AV includes a number of devices such as sensors, controllers, processors, steering controls, brakes, gears, accelerators that work together to guide the AV from a first location to a second location. In some instances, the AV can be used to transport a passenger from the first location to the second location. For example, a ride hailing service can use AVs to provide transportation services, where one or more passengers are transported in return for payment of a fare or other costs.

DETAILED DESCRIPTION

Figure 1:
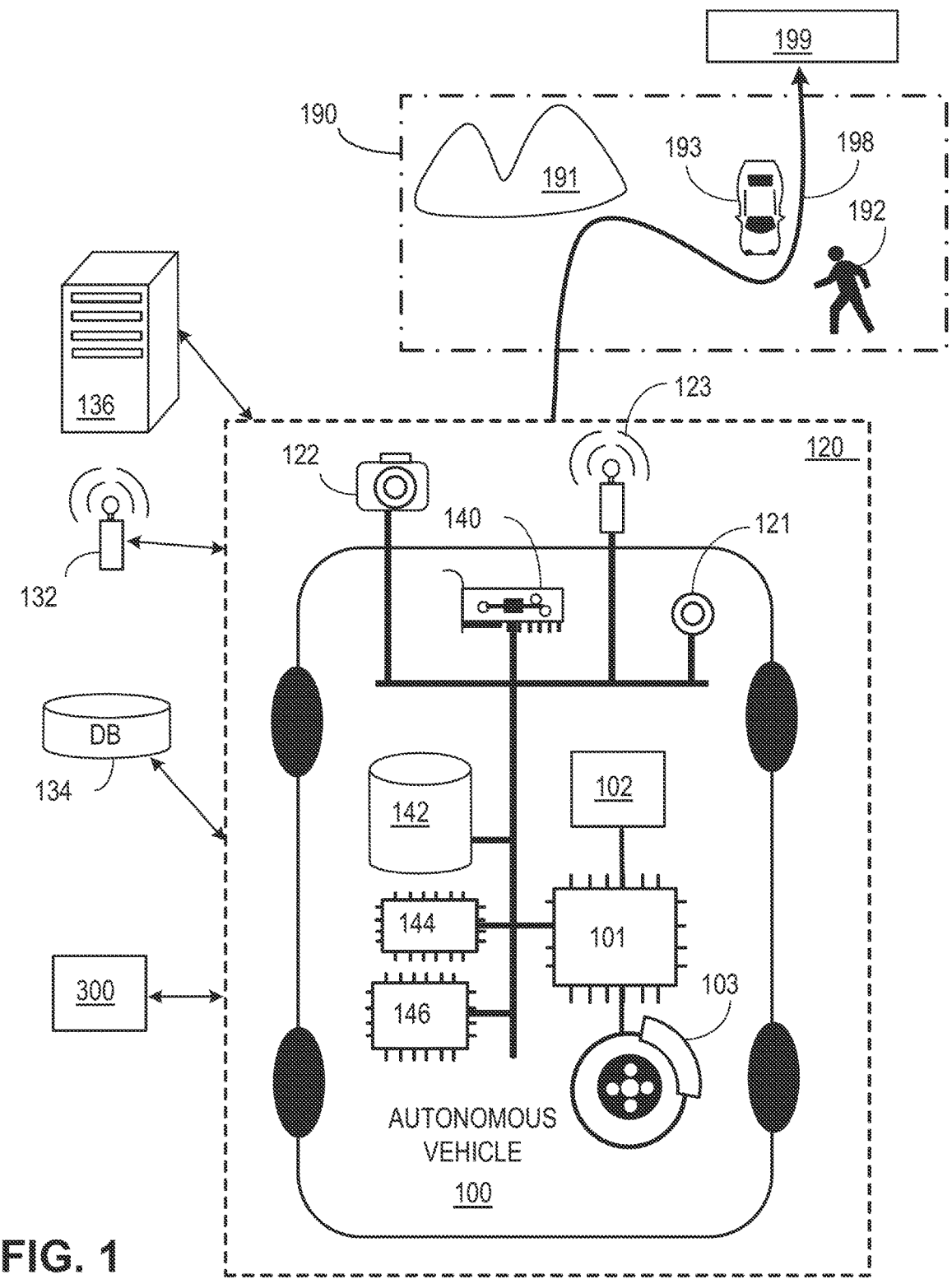
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. Passenger support System
8. Process for a Passenger support System

General Overview

Application (app) based transportation services enable providers to be connected with passengers in need of transportation. Traditionally, a passenger requests transportation and a provider responds to the request and provides the passenger with transportation from a first location to a second location. In the case where the provider is a human driver, the human driver is available to assist and verify the safety of passengers while providing transportation services. Additionally, the passenger can rely on the human driver in the case of an emergency. Accordingly, human drivers may serve as an authority in a potentially dangerous or violent situation. For example, a single passenger that hails a ride at night often relies on the human driver to be aware of potentially dangerous or violent situations. When a vehicle arrives with a human driver to provide transport to a passenger and an unauthorized person attempts to intervene (e.g., get in the vehicle with the passenger, harm the passenger), a human driver is available to help the passenger in overcoming the potentially dangerous or violent situation. In a vehicle without a driver (e.g., a driverless vehicle), the passenger is alone and assistance is not immediately available for overcoming the potentially dangerous or violent situation.

The present techniques enable a passenger support system (e.g., buddy system) that supports passengers and potential passengers when hailing a ride from a first location to a second location. The passenger support system is implemented in, for example, driverless vehicles such as a robotic taxi (e.g., robotaxi). In some examples, a passenger support system feature provides the passenger with support and assistance if necessary in unnerving situations. The passenger provides details of their trip, such as that they are traveling alone, and selects passenger support (e.g., a buddy) to ensure the passenger reaches their destination safely. In an example, when the passenger opts-in to the passenger support system, one of two things may occur: 1) the vehicle occupancy is transmitted to an on-demand mobility (ODM) partner. For example, if the passenger has provided details that the passenger is traveling alone, the expected vehicle occupancy is one (e.g., a single passenger traveling alone). In some embodiments, if the occupancy is greater than one, a Remote Customer Assistant (RCA) is notified and checks a cabin monitoring data feed to determine if an unauthorized person is in the vehicle with the passenger. The RCA responds as needed. For example, if an unauthorized person is present in the cabin of the vehicle, the RCA takes actions to assist the passenger. The actions include, for example, to alert authorities (e.g., dialing 911), lock or unlock one or more doors/windows, or issue audio or visual warnings from the vehicle. In examples, the RCA dials into the car to check on the passenger as soon as they enter the vehicle to ensure the passenger is safe.

For ease of description, the passenger support system is described using a single passenger traveling alone. However, the passenger support system described according to the present techniques is not limited to a single passenger. For example, a party traveling together with multiple passengers can opt in to the passenger support system by identifying the number of passengers in the party. If the detected vehicle occupancy exceeds the expected vehicle occupancy, RCA is notified and checks the cabin monitoring data feed to determine if an unauthorized person is in the vehicle with the passenger. The RCA can then respond as needed. The present techniques enable a heightened safety when traveling using autonomous vehicles.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
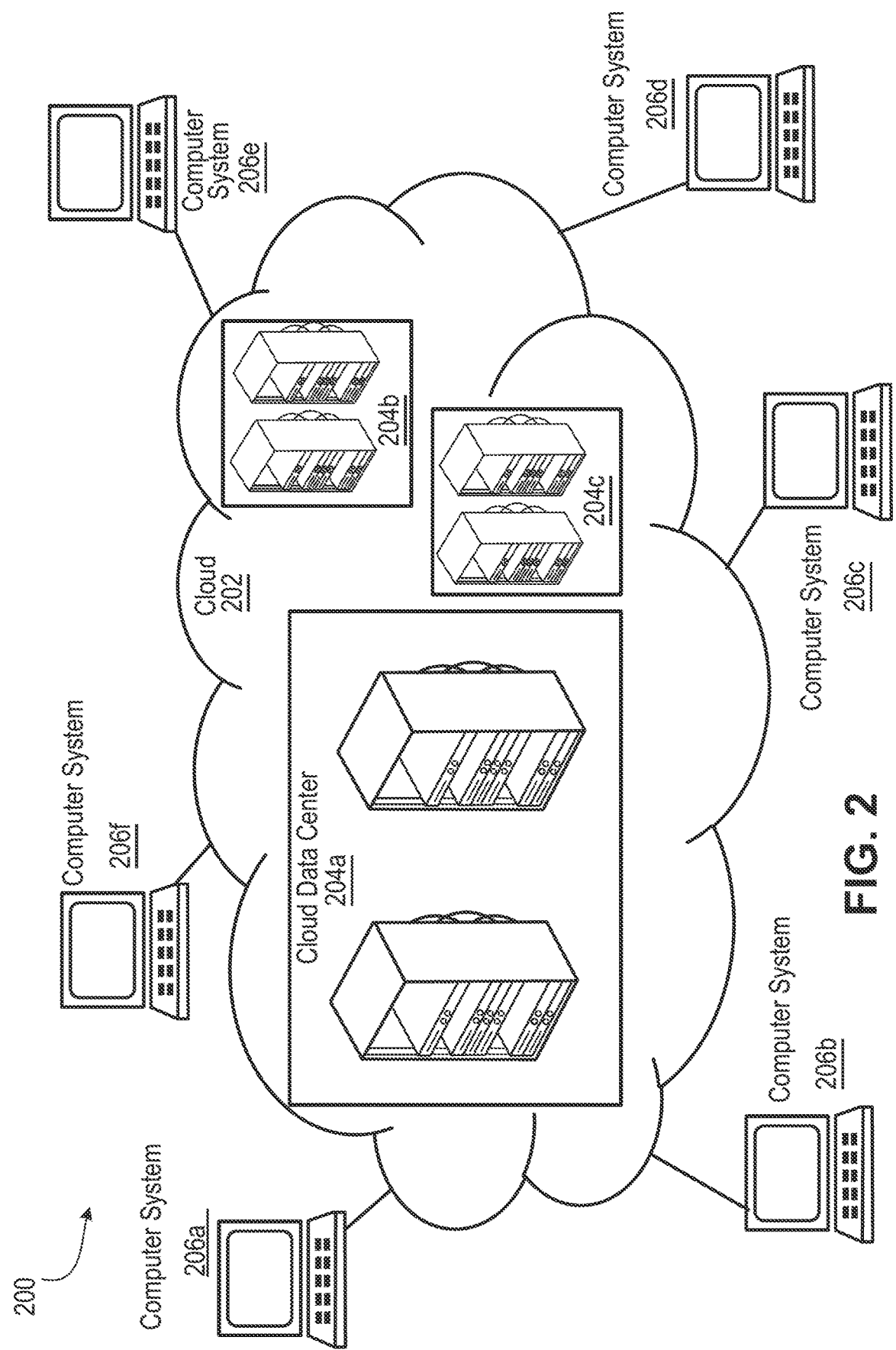
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in some embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
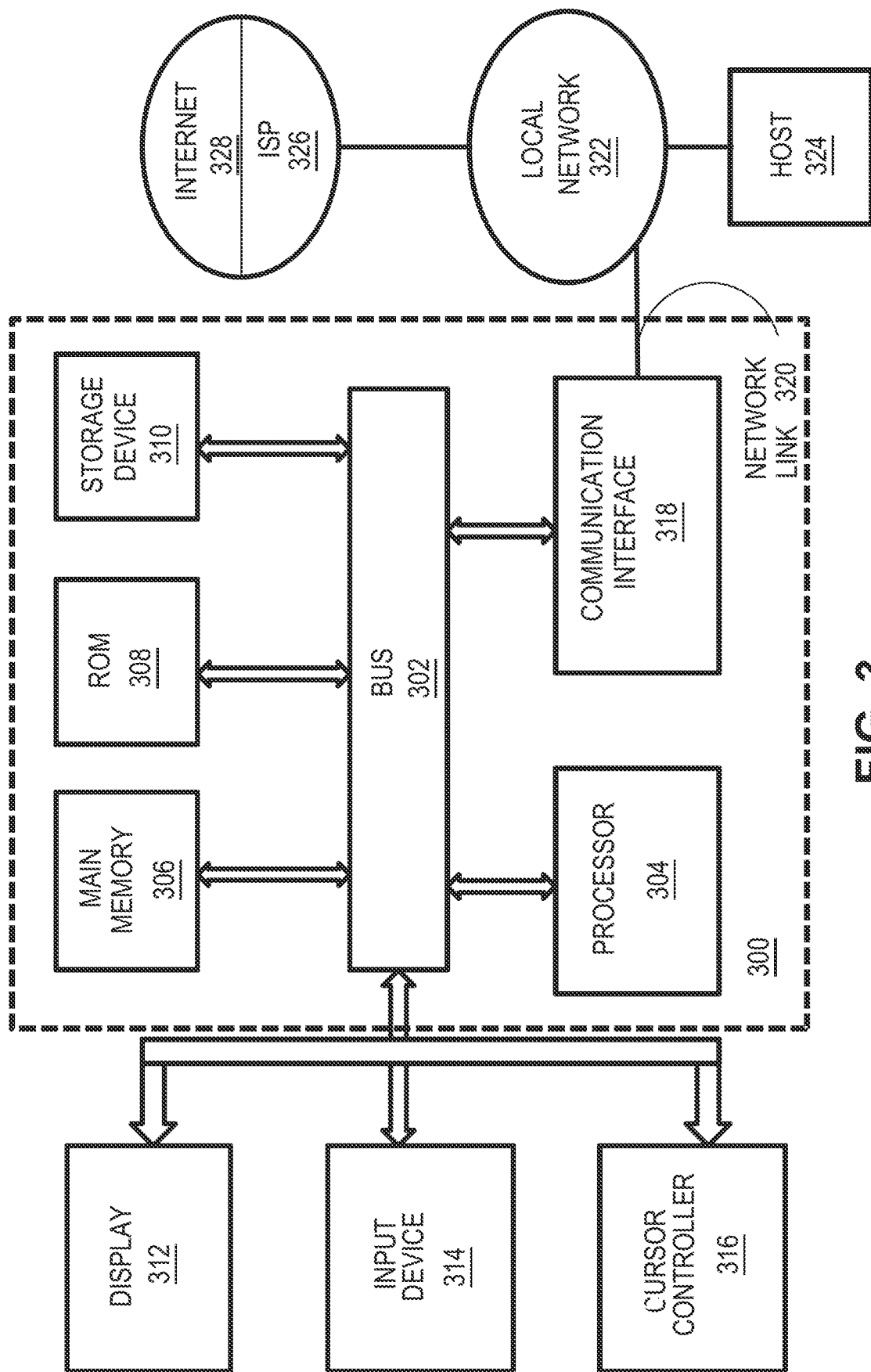
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
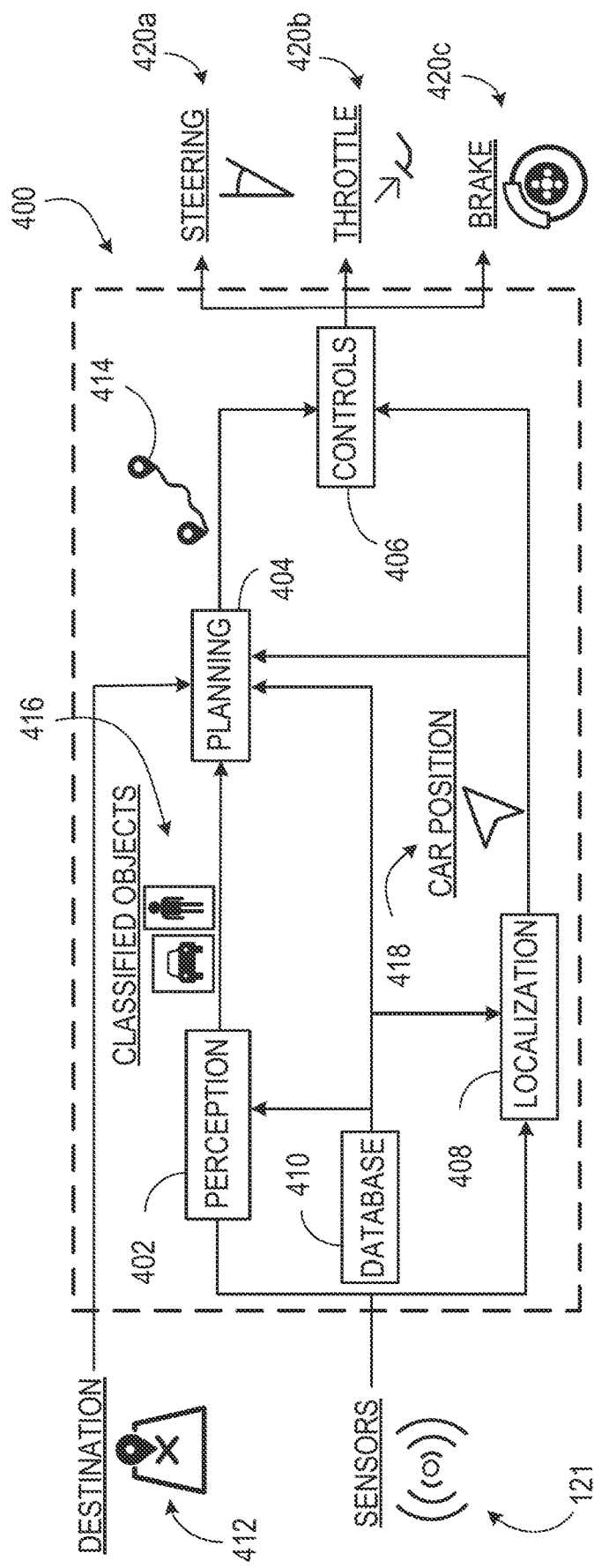
FIG. 4 shows an example architecture for an AV.

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
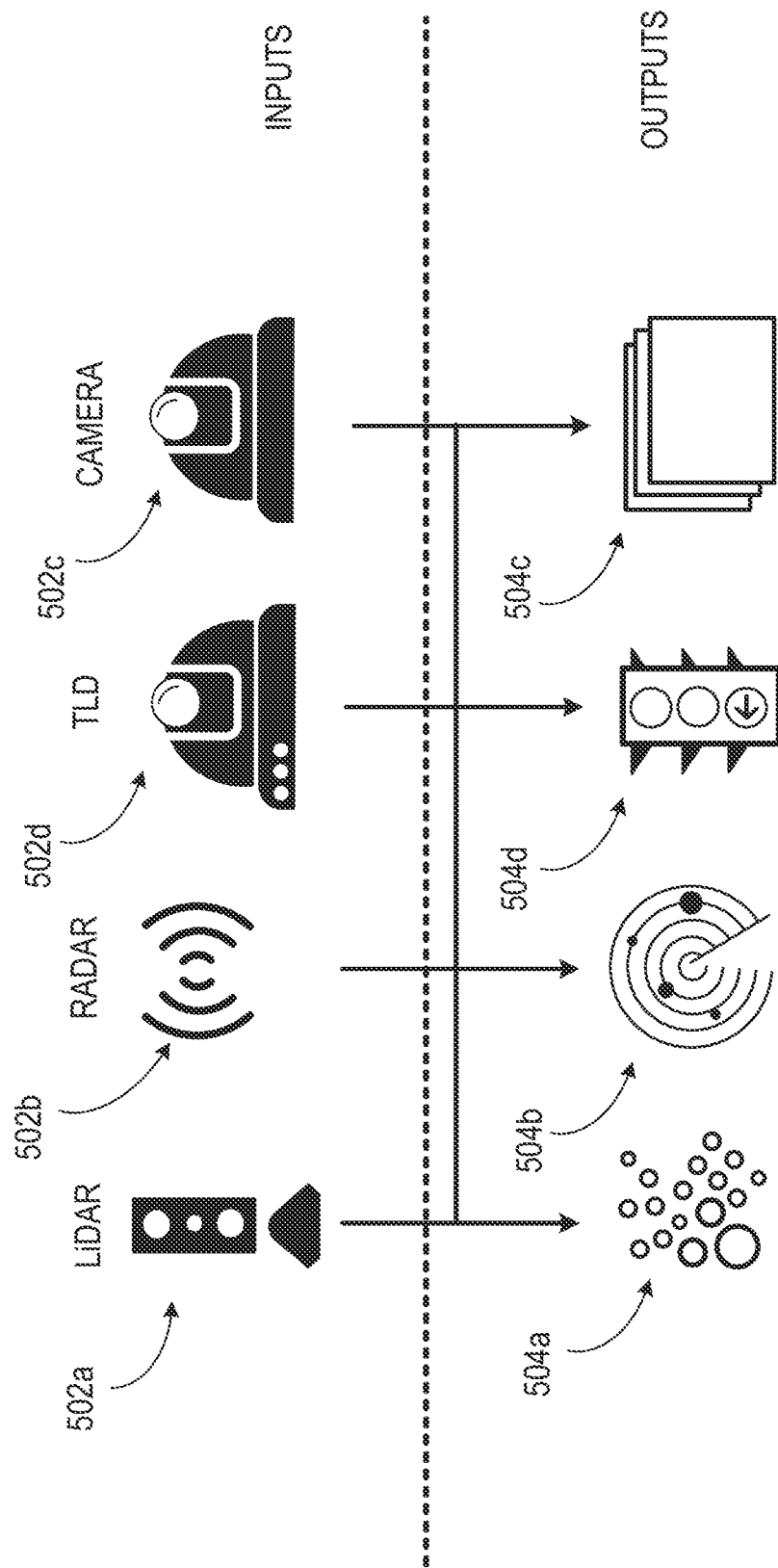
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
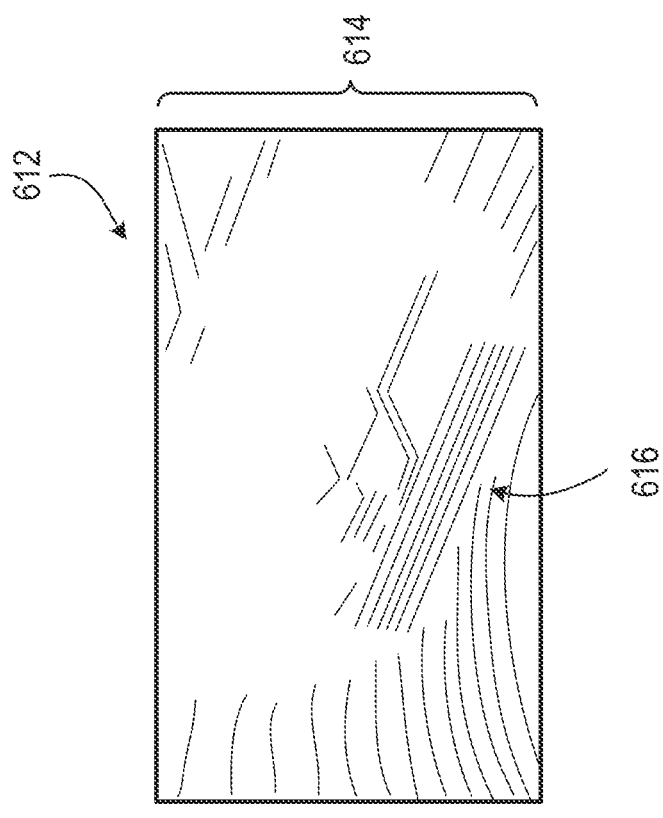
FIG. 6 shows an example of a LiDAR system.
Figure 6:
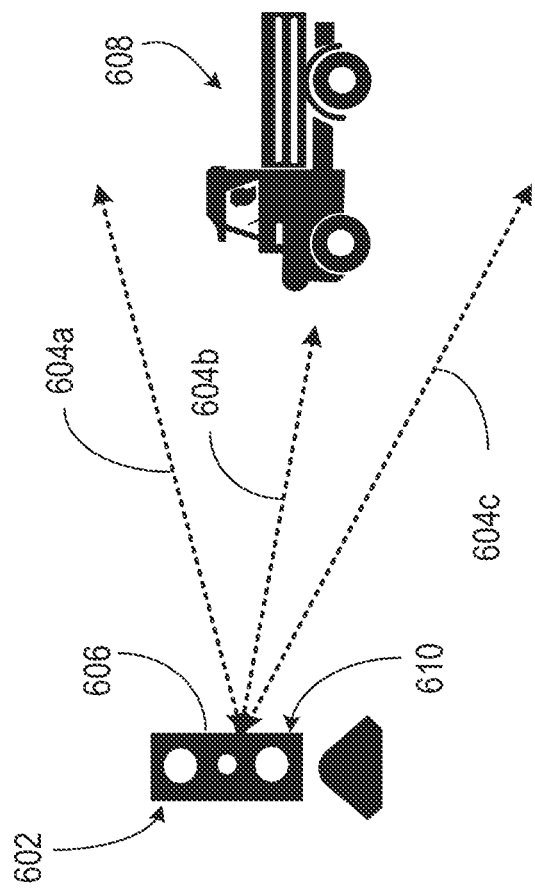

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
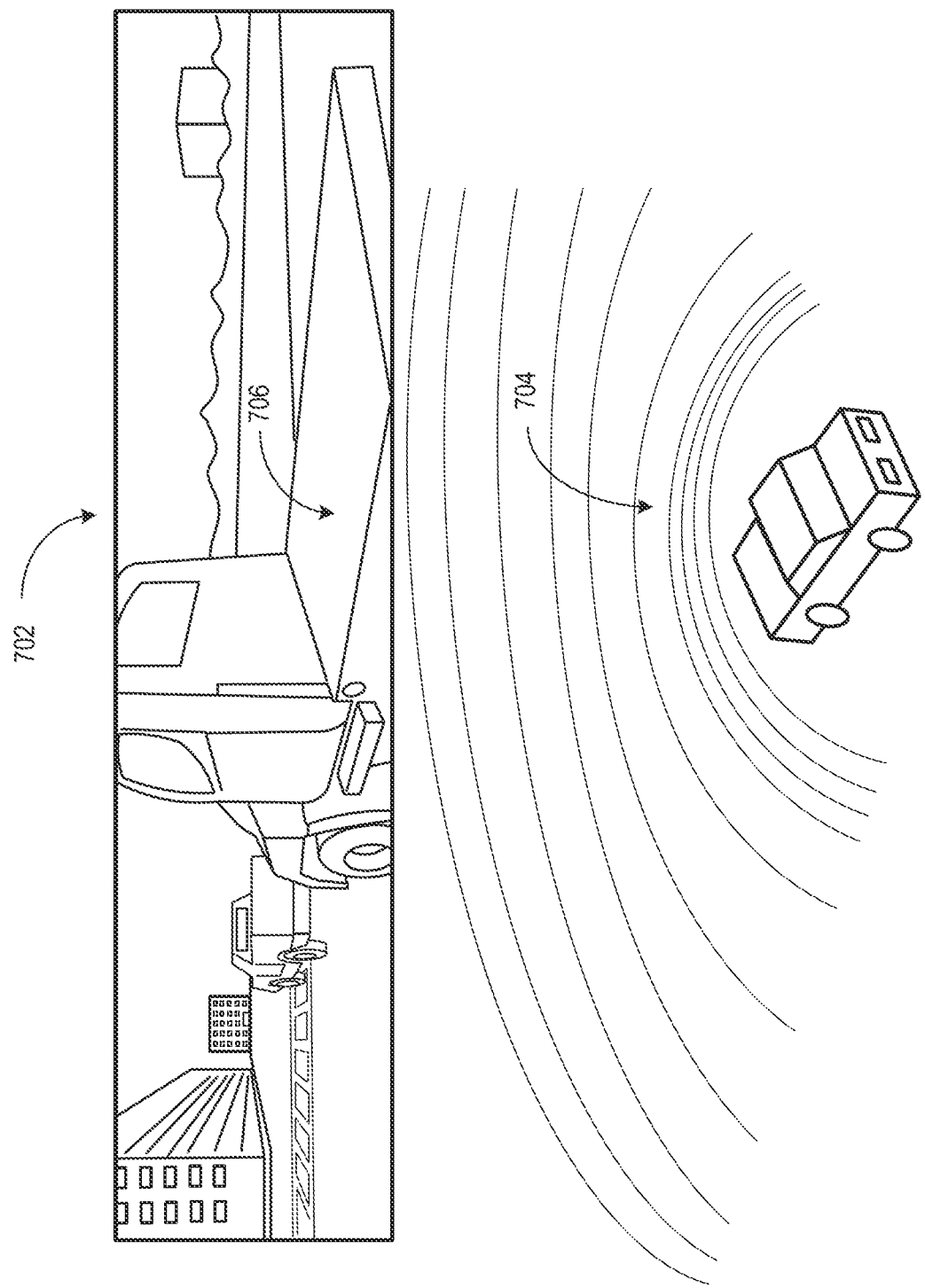
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
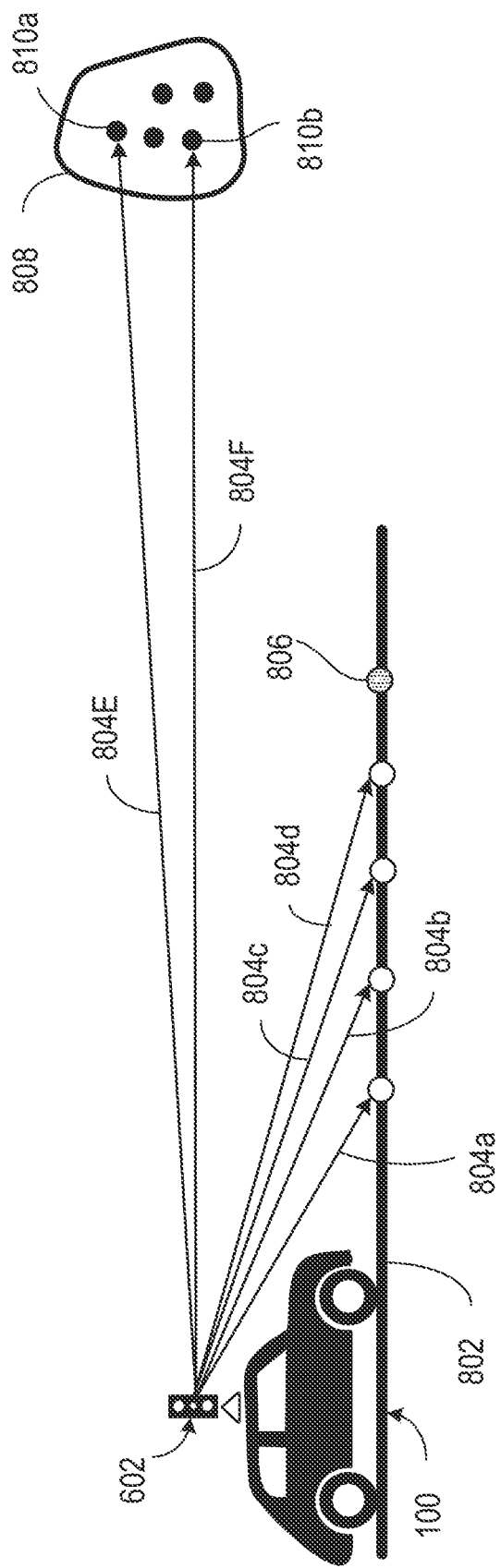
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Path Planning

Figure 9:
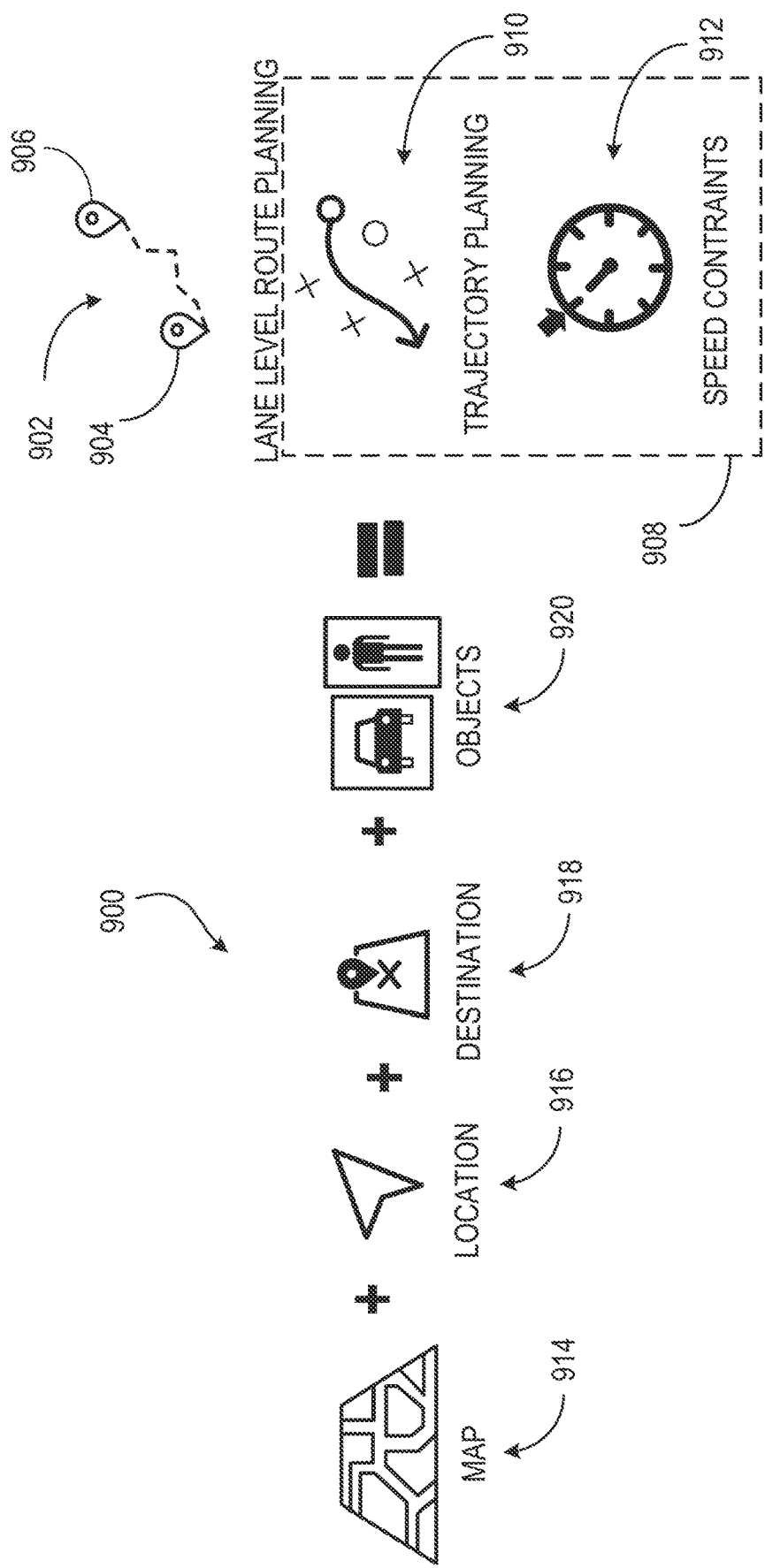
FIG. 9 shows a block diagram of the relationships between inputs and outputs of a planning system.

FIG. 9 shows a block diagram 900 of the relationships between inputs and outputs of a planning system 404 (e.g., as shown in FIG. 4). In general, the output of a planning system 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning system also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning system 404 includes database data 914 (e.g., from the database system 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception system 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
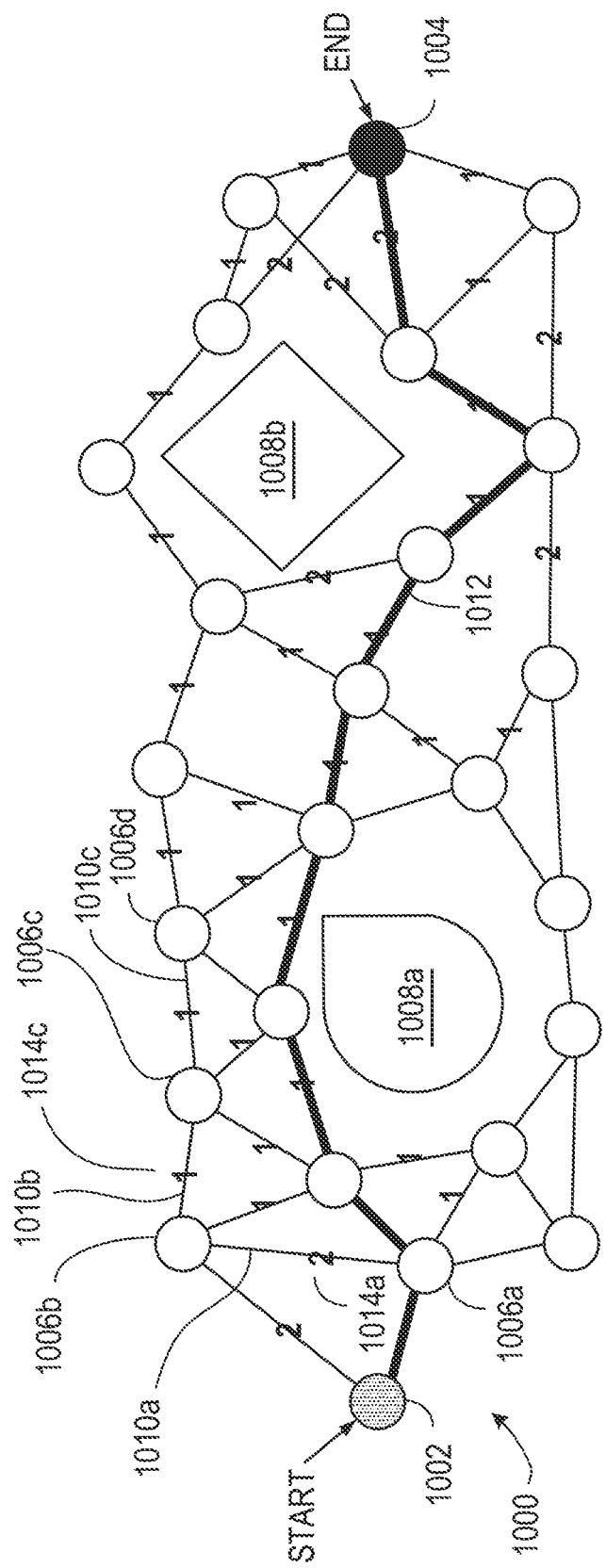
FIG. 10 shows a directed graph used in path planning.

FIG. 10 shows a directed graph 1000 used in path planning, e.g., by the planning system 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010*a-c* are often bidirectional, in the sense that a vehicle 100 travels from a first node to a second node, or from the second node to the first node. In an embodiment, edges 1010*a-c* are unidirectional, in the sense that an vehicle 100 can travel from a first node to a second node, however the vehicle 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning system 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the vehicle 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning system 404 identifies a path 1012 between the start point 1002 and end point 1004, the planning system 404 typically chooses a path optimized for cost, e.g., the path that has the least total cost when the individual costs of the edges are added together.

AV Control

Figure 11:
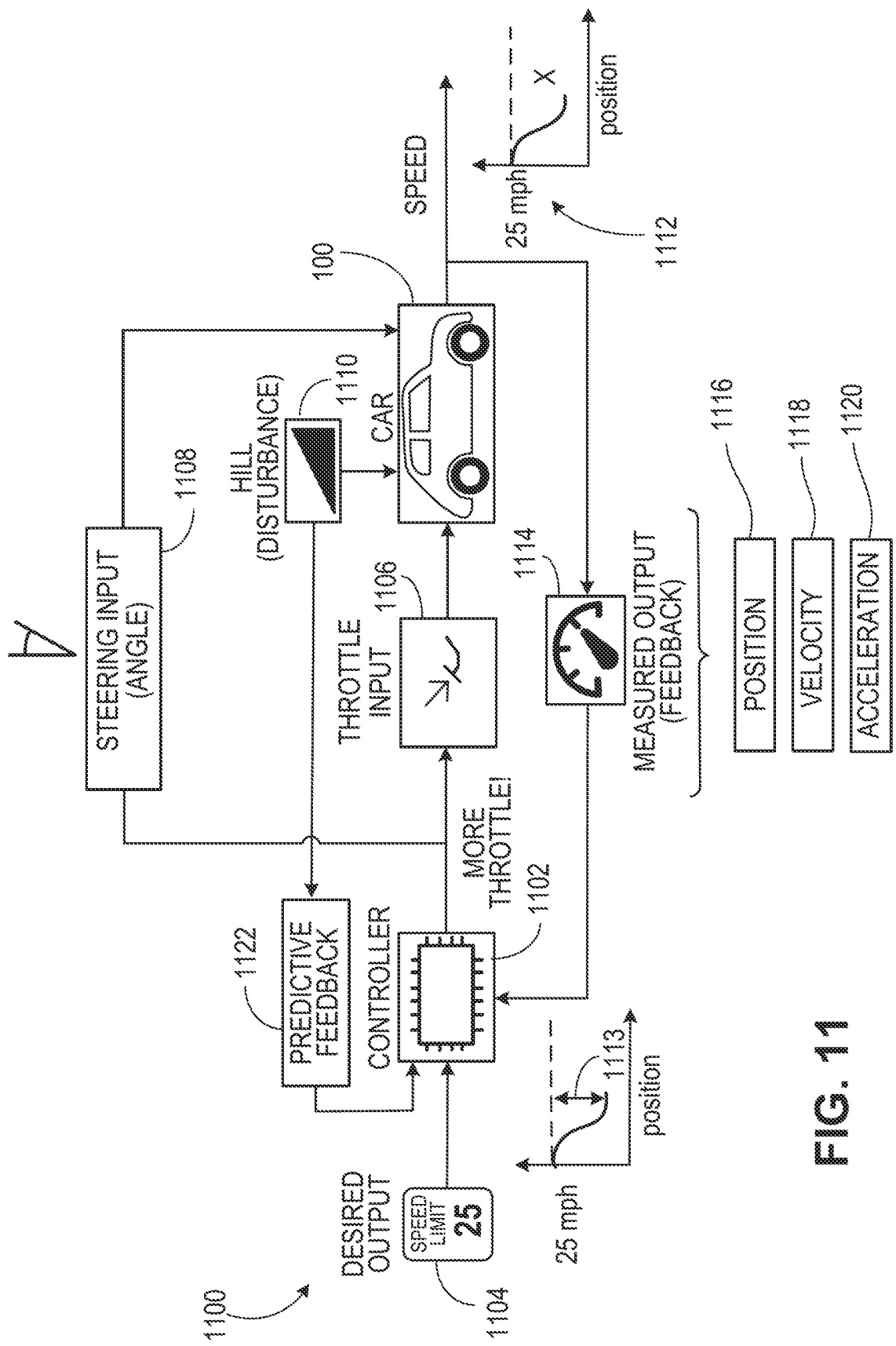
FIG. 11 shows a block diagram of the inputs and outputs of a control system.

FIG. 11 shows a block diagram 1100 of the inputs and outputs of a control system 406 (e.g., as shown in FIG. 4). A control system operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning system 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback system 1122. The predictive feedback system 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
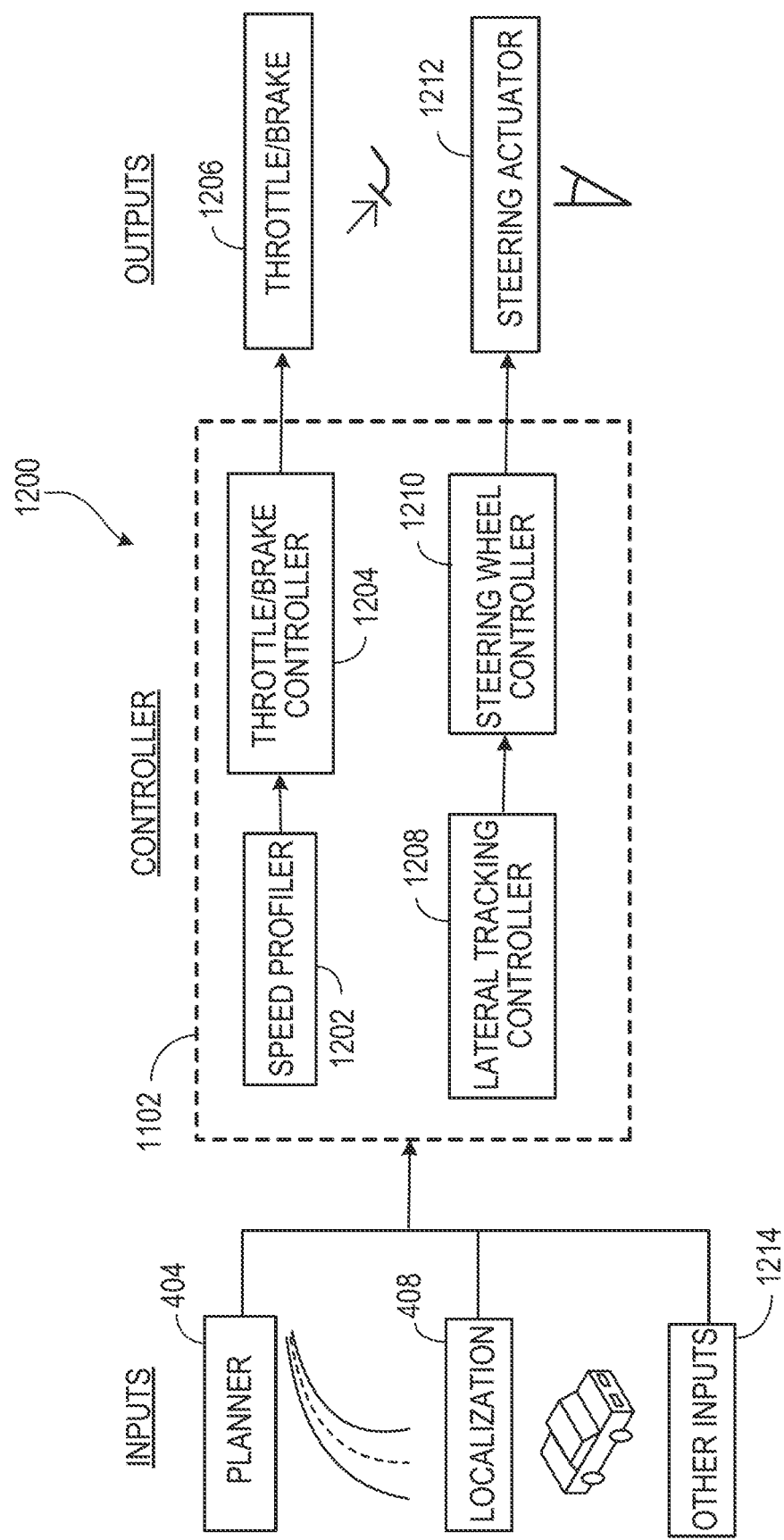
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning system 404 provides information used by the controller 1102, for example, to choose a heading when the vehicle 100 begins operation and to determine which road segment to traverse when the vehicle 100 reaches an intersection. A localization system 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Passenger Support System

Figure 13:
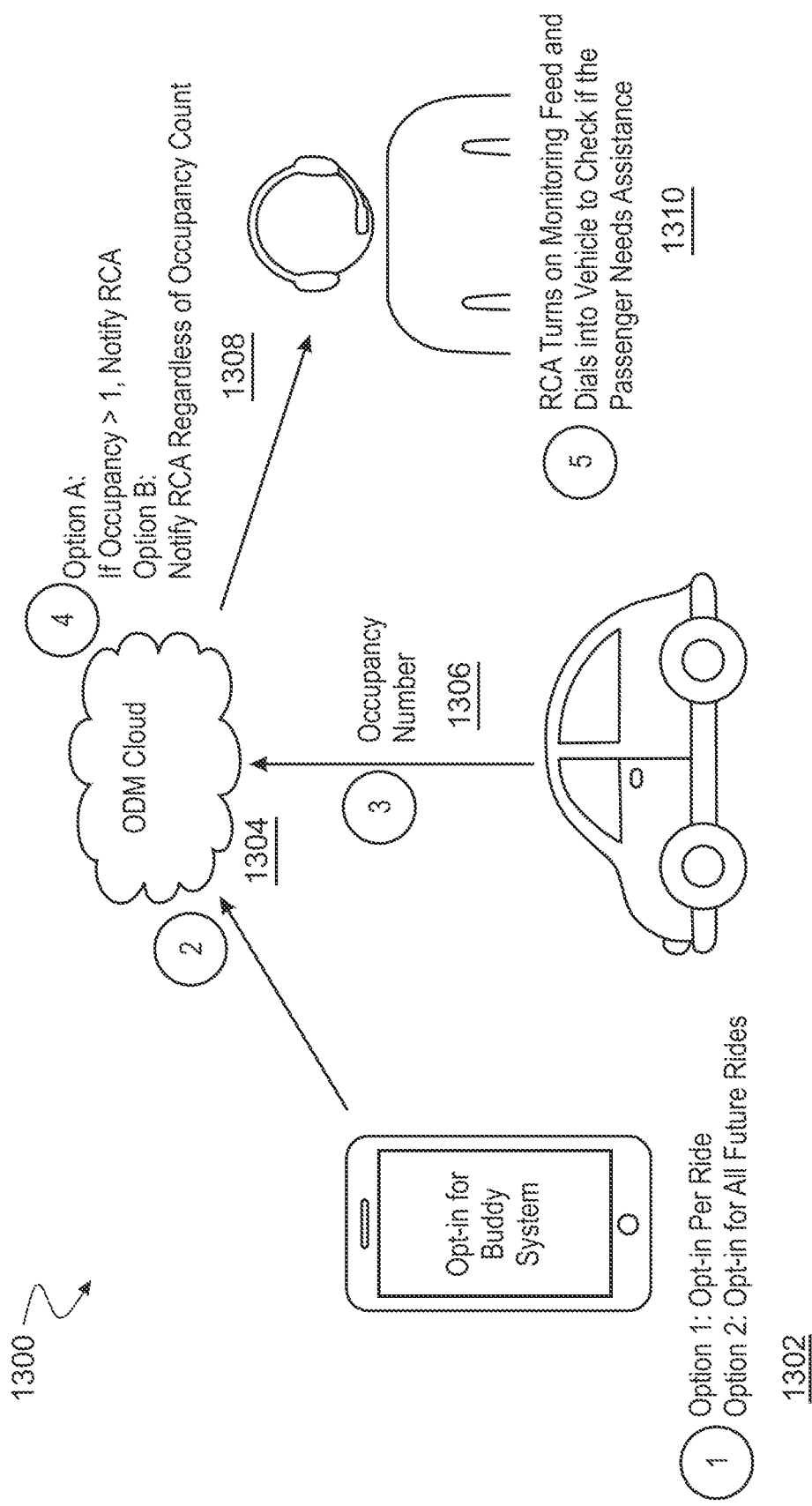
FIG. 13 is a block diagram of a system that enables a passenger support system.

FIG. 13 is a block diagram of a system 1300 that enables a passenger support system. In some embodiments, the system 1300 is implemented (e.g., completely, partially, etc.) using an AV system that is the same as or similar to AV system 120, described in reference to FIG. 1. In some embodiments, the system 1300 is implemented (e.g., completely, partially, etc.) using a cloud server that is the same as or similar to cloud server 136, described in reference to FIG. 1. In some embodiments, the system 1300 is implemented (e.g., completely, partially, and/or the like) by another device or system, or another group of devices and/or systems that are separate from, or include, the system 1300. For example, the system 1300 can be implemented (e.g., completely, partially, and/or the like) at a cloud computing environment 200 of FIG. 2. In some embodiments, the system 1300 is implemented between any of the above-noted systems in cooperation with one another.

The passenger support system is implemented during the execution of autonomous vehicle transportation services. In the example of FIG. 13, a particular sequence of communication is illustrated. However, the present techniques should not be limited to the sequence of communication as described herein. Further, for ease of description FIG. 13 is described using a single passenger seeking transportation services. However, the present techniques may apply to any number of passengers traveling in a group. For example, the passenger support system can provide assistance for a party that includes multiple passengers.

At reference number 1302, options are provided for the passenger support system. In some embodiments, one or more passengers opt in to the passenger support system when securing transportation services. For example, passengers can opt-in or activate the passenger support system when seeking additional safety and security using an app to obtain on-demand transportation. In some examples, the transportation services are rendered by a vehicle that includes autonomous functionality. For example, the vehicle is a driverless vehicle that transports one or more passengers from a first location to a second location. In examples, the vehicle is a vehicle controlled by one or more remote operators that transports passengers from a first location to a second location. In examples, the transportation services are provided by a personally owned vehicle. In examples, the transportation services are provided by a fleet vehicle, such as a taxi or other vehicle for hire. In some embodiments, a passenger can select to opt in to the passenger support system for a single ride (e.g., a single round of transportation from a first location to a second location). In some embodiments, a passenger can select to opt in to the passenger support system for all rides. Additionally, in some embodiments a passenger opt outs of the passenger support system. The passenger support system is further described with respect to FIG. 14. When requesting a ride one or more passengers provides additional details, including the number of occupants participating in the ride.

At reference number 1304, the on demand mobility (ODM) cloud is notified of the passenger support system options and details. In some embodiments, details are obtained for passengers that opt-in to the passenger support system. In an example, the ODM cloud is supported, managed, and/or controlled by an ODM partner. Generally, on demand mobility refers to publically available transportation provided via private enterprise. ODM services provide a passenger centric form of transportation, providing a wide range of passenger choice and efficient delivery of transportation services. ODM partners enable complete point-to-point transportation. Often, ODM partners provide transportation services in challenging areas, such as transit deserts. ODM partners bridge transportation service gaps in first mile/last mile, corporate transportation, paratransit/dial-a-ride, and university shuttle services. An ODM partner enables Mobility-as-a-Service (MaaS). In some embodiments, the passenger support system as described herein spans a multi-modal aggregation of transport modes as well as on-demand mobility.

In an example, an ODM cloud collects trip requests in real time. Simultaneously, an occupancy number is reported by the AV. The occupancy number reported by the AV is a vehicle detected number of passengers. The vehicle detected number of passengers may be an anticipated occupancy number determined as the passengers approach the AV. Accordingly, at reference number 1306 the vehicle detected number of passengers reported from the AV is determined in any number of ways. In some embodiments, the occupancy number is determined via a remote visual inspection of the cabin interior. In some embodiments, the occupancy number is determined according to one or more sensors located within the AV. In some embodiments, the occupancy number is determined via one or more sensors located on the exterior of the AV. In some embodiments, the occupancy number is determined according detection techniques using data gathered from the AV. The occupancy number is continually updated as passengers approach the AV until the AV initiates navigation from the first transportation location.

In some embodiments, the occupancy number is determined by the AV using one or more sensors (e.g., sensor 121 of FIG. 1). In examples, the sensors used by the AV to determine occupancy include image sensors, biometric sensors, weight sensors, seat belt sensors, and the like. The AV determines a number of passengers within a predetermined distance of the AV. In examples, the predetermined distance is relative to the environment. The predetermined distance used in a sparse environment is greater than the predetermined distance used in a dense environment. For example, in a dense environment with many people the predetermined distance used to determine an occupancy number can be 5, 10, or 15 feet. In a sparse environment with few people, the predetermined distance used to determine an occupancy number can be, for example, 15 feet or more. The predetermined distances described are for exemplary purposes. The predetermined distances can be any distance for which the AV has sensor data.

In examples, an AV system that is the same as or similar to AV system 120 of FIG. 1 receives sensor data from sensors (e.g., sensors 121), including sensors for sensing or measuring properties of the AV's environment. In examples, the sensors include, monocular or stereo video cameras in the visible light, infrared or thermal (or both) spectra, LiDAR, RADAR, ultrasonic sensors, time-of-flight (TOF) depth sensors, speed sensors, temperature sensors, humidity sensors, and precipitation sensors. In examples, a distance of potential passengers to the AV is used to determine an occupancy number. For example, passengers located within the predetermined distance are counted as occupants. Passengers not located within the predetermined distance are not counted as occupants. In examples, a distance of the passengers to the AV and a direction of movement of the passengers is used to determine an occupancy number. For example, passengers located within the predetermined distance and moving toward the AV are counted as occupants. Passengers located within the predetermined distance and moving away from the AV are not counted as occupants. In examples, the AV determines a number of individuals in proximity to the AV and determines the occupancy based on the individuals outside the AV prior to opening a door of the AV. The AV determines a number individuals outside the AV after doors of the AV are closed. The reported occupancy number is the number of individuals outside the AV prior to opening a door of the AV, minus the number individuals outside the AV after doors of the AV are closed.

In some embodiments, a predetermined threshold is applied to data obtained from at least one sensor. In examples, if the sensor data is greater than the predetermined threshold, the number of passengers reported by the AV is increased. If the sensor data is less than the predetermined threshold, the number of passengers reported by the AV is not increased. For example, each seat in the AV is associated with one or more weight sensors. In response to the weight sensor exceeding a predetermined threshold, the AV increases the number of passengers reported. In some embodiments, the AV determines a number of individuals using predetermined thresholds after doors of the AV are closed.

At reference number 1308, service options are provided in response to an occupancy number reported from the passengers (e.g., reference number 1302) being unequal to a detected occupancy number determined by the AV (e.g., reference number 1306). In some embodiments, an ODM partner manages the ODM cloud at reference number 1304. The ODM partner provides one or more services for assistance. Consider an example where the determined occupancy of the AV is greater than one and a passenger has opted-in to the passenger support system. In this example, the passenger has provided details that (s)he is traveling alone (e.g., occupancy=1 reported by the passenger). An option is provided to notify a remote customer assistant since the AV determined occupancy is greater than the reported occupancy. In some embodiments, an option is provided to notify the remote customer assistant regardless of the occupancy count within the vehicle when the passenger requests transportation services.

At reference number 1310, the remote customer assistant accesses an AV monitoring data feed and reviews vehicle specific information to determine if the passenger needs assistance. In examples, the remote customer assistant is automated. For example, the remote customer assistant is a chatbot or software agent that performs one or more tasks. The automated remote customer assistant mimics a human and provides passenger support. In examples, the remote customer assistant is a human. In examples, the remote customer assistant is a hybrid remote customer assistant. A hybrid remote customer assistant is a combination of both an automated remote customer assistant and a human remote customer assistant. The automated remote customer assistant passes tasks to a human remote customer assistant as needed. For example, an initial discrepancy between an occupancy number reported from the passengers (e.g., reference number 1302) and the detected occupancy number determined by the AV (e.g., reference number 1306) is verified by an automated remote customer assistant. In response to verification, a human remote customer assistant determines if further passenger support or assistance is needed.

In some embodiments, the remote customer assistant (e.g., automated remote customer assistant, human remote customer assistant, hybrid remote customer assistant) accesses the vehicle data, including video vehicle data, to determine if the passenger needs assistance. In some embodiments, the remote customer assistant accesses vehicle audio data to determine if the passenger needs assistance. The remote customer assistant can implement one or more actions in support of passenger safety. For example, the remote customer assistant alerts authorities to provide support in emergency situations. In examples, the remote customer assistant alerts fire, police, or ambulance services. In examples, the remote customer assistant alerts authorities via the available emergency telephone number associated with the location of the vehicle. For example, in North America the remote customer assistant can dial 911 and alert authorities to a potentially dangerous situation. In some embodiments, the remote customer assistant can enable enhanced 911 services, where the remote customer assistant automatically provides a location associated with the potentially dangerous situation.

In addition to alerting authorities in a potentially dangerous situation, the remote customer assistant can also take one or more actions at the vehicle to mitigate a potentially dangerous situation. For example, the remote customer assistant can lock or unlock one or more doors/windows. When an unauthorized person is detected within the vehicle, the remote customer assistant can take actions to keep the unauthorized person within the vehicle and enable the authorized passenger to exit the vehicle. In response to the reported number of passengers being unequal to the vehicle detected number of passengers, an unauthorized person within the vehicle is detected. In examples, the remote customer assistant strategically controls doors and windows of the vehicle to separate the passengers and unauthorized persons, or to prevent confinement of the passengers and unauthorized persons within the vehicle. For example, all doors are unlocked and windows rolled down to enable views inside the vehicle when an unauthorized person is detected in the vehicle. In another example, the remote customer assistant causes the vehicle to emit visual and auditory alerts in response to the reported number of passengers being unequal to the vehicle detected number of passengers. For example, the remote customer assistant can cause the horns or other sounds to be produced by the vehicle to alert others near the vehicle of the potentially dangerous situation. In examples, the remote customer assistant can cause flashing lights, red lights, or other types of illumination to be produced by the vehicle to alert others near the vehicle of the potentially dangerous situation.

In an example, the present techniques enable an aggregation of safety data based on customer opt-ins for the passenger support system according to location. An area is identified as a safety risk based on a higher number of passengers opting in to the passenger support system in the area when compared to historical requests to opt-in to the passenger support system in the area. For example, transportation requests issued by potential passengers are transmitted to the on demand mobility partner. The on demand mobility partner maintains a safety network that indicates physical locations with a higher need for passenger safety measures. For example, in response to a higher number of customers opting in to the passenger support system in a particular area, the on demand mobility partner flags that location or area as representing a safety risk. The on demand mobility partner can notify authorities of the perceived safety risk. In some embodiments, the on demand mobility partner maintains historical safety data.

The block diagram of FIG. 13 is not intended to indicate that the system 1300 is to include all of the components shown in FIG. 13. Rather, the system can include fewer or additional components not illustrated in FIG. 13 (e.g., additional passengers, vehicles, assistants, authorities, etc.). The system includes any number of additional components not shown, depending on the details of the specific implementation. Furthermore, any of the described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 14:
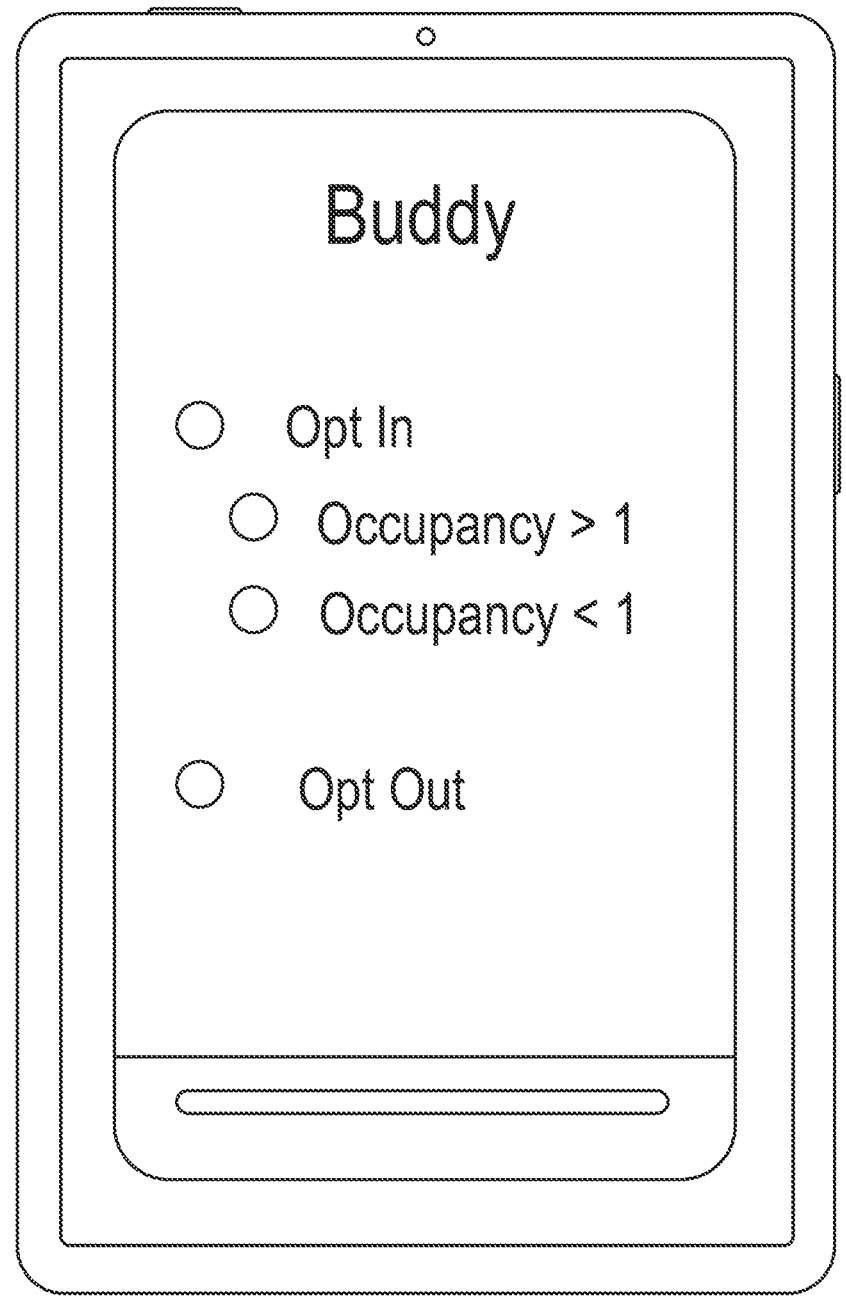
FIG. 14 is a block diagram of a device that enables opting in or out of the passenger support system.

FIG. 14 is a block diagram of a device 1400 that enables opting in or out of the passenger support system (e.g., buddy system). In some embodiments, the device 1400 is implemented (e.g., completely, partially, etc.) using an AV system that is the same as or similar to AV system 120, described in reference to FIG. 1. In some embodiments, the device 1400 is implemented (e.g., completely, partially, etc.) using a cloud server that is the same as or similar to cloud server 136, described in reference to FIG. 1. In some embodiments, the device 1400 is implemented (e.g., completely, partially, and/or the like) by a system that is the same as or similar to the system 300 of FIG. 3. In some embodiments, the device 1400 includes any of the above-noted systems in cooperation with one another. In some embodiments, the device 1400 is a personal device (e.g., smart phone, tablet, laptop, etc.).

In an example, a passenger can opt in to the passenger support system on a per ride basis or for all future rides. For example, after a passenger hails a ride from an on demand mobility provider, the passenger is presented with options offered by the passenger support system. In an example, a first option enables a passenger to opt in to the passenger support system for the current, specific ride. An example, a second option enables a passenger to enroll in the passenger support system for all future rides. In some embodiments, when a passenger enrolls in the passenger support system for all future rides, (s)he are enrolled in the passenger support system until the passenger opts out of the passenger support system.

In some embodiments, the passenger support system enables a passenger to identify if they are traveling in a party (e.g., expected occupancy greater than one). For example, in some cases passengers traveling in small groups desire the passenger support system functionality to ensure a higher level of safety. A passenger can indicate the number of people traveling in the group. The present techniques perform an occupancy check that compares the number of people in the vehicle as reported by the passenger with the number of people in the vehicle as detected by the vehicle. If the number of people in the vehicle as reported by the passenger does not match the number of people in the vehicle as detected by the vehicle, a remote customer assistant accesses the vehicle to determine if assistance is required.

The block diagram of FIG. 14 is not intended to indicate that the device 1400 is to include all of the options shown in FIG. 14. Rather, the options can include fewer or additional components not illustrated in FIG. 14 (e.g., additional passengers, vehicles selections, opt-in circumstances, opt-out circumstances, etc.). The system includes any number of additional components not shown, depending on the details of the specific implementation. Furthermore, any of the described functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Process for a Passenger Support System

Figure 15:
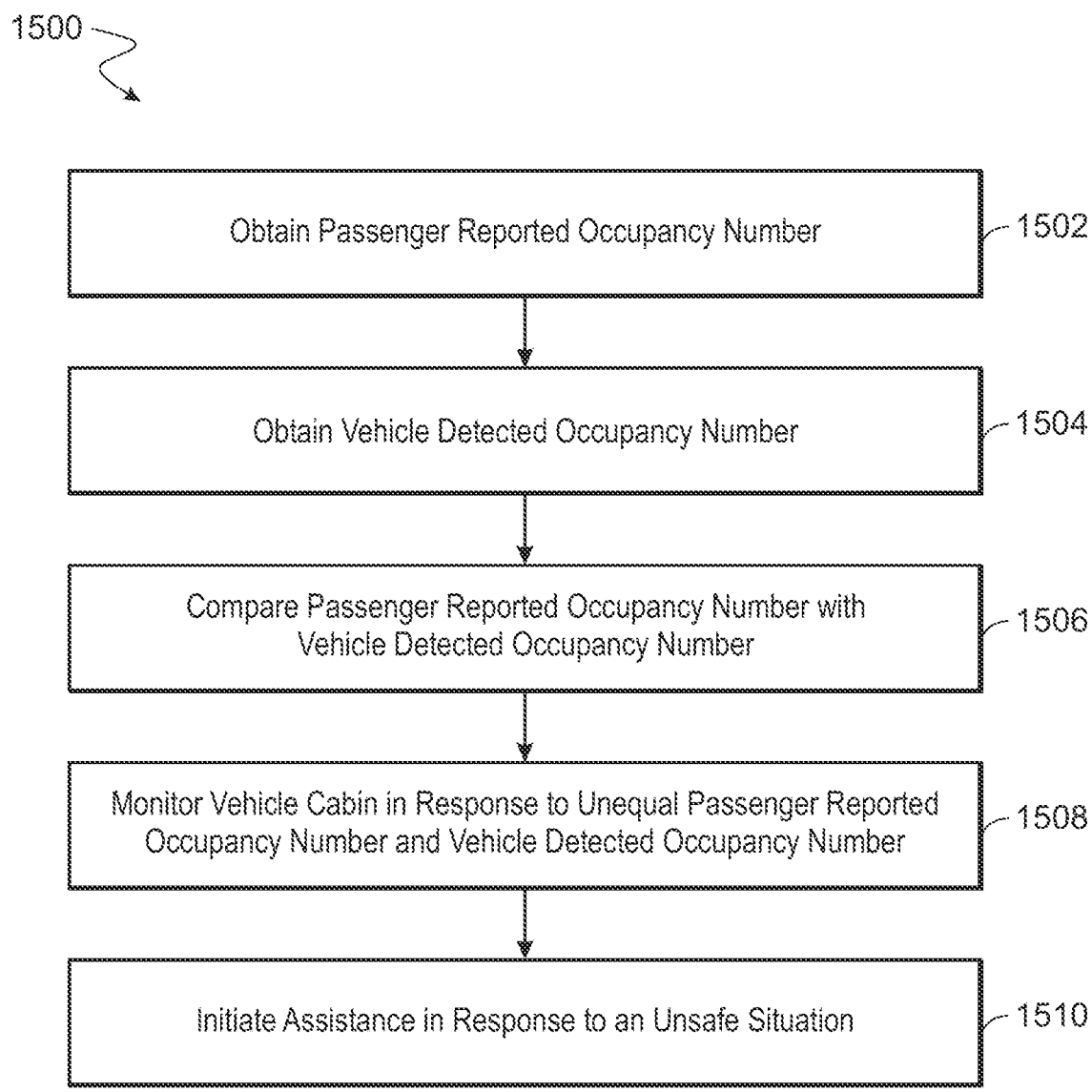
FIG. 15 is a process flow diagram of a process that enables a passenger support system.

FIG. 15 is a process flow diagram of a process that enables a passenger support system for driverless vehicles. In some embodiments, the process 1500 enables a passenger support system (e.g., buddy system) for a robotaxi. In some embodiments, the process 1300 is implemented (e.g., completely, partially, etc.) using an AV system that is the same as or similar to AV system 120, described in reference to FIG. 1. In some embodiments, the process 1500 is implemented (e.g., completely, partially, etc.) using a cloud server that is the same as or similar to cloud server 136, described in reference to FIG. 1. In some embodiments, the process 1500 is implemented using any of the above-noted systems in cooperation with one another.

At block 1502, the passengers associated with a reservation for transportation are determined. For example, for a passenger traveling alone, it is determined that the passenger is the only passenger for a reservation and the passenger reported occupancy is one.

At block 1504, the passenger reported occupancy number is transmitted to the on demand mobility partner. In some embodiments, the passenger reported occupancy number is transmitted with an indication that the passenger(s) are opting in to the passenger support system. In some embodiments, the passenger reported occupancy number is transmitted with an indication that the passenger(s) are opting out of the passenger support system. In some embodiments, the passenger indicates that the passenger(s) are opting out of the passenger support system.

At block 1506, a vehicle detected occupancy number is transmitted to the on demand mobility partner. In some embodiments, the vehicle detected occupancy number is determined based on a visual inspection of the interior of the vehicle. In some embodiments, the vehicle detected occupancy number is determined based on one or more sensors inside the vehicle. In some embodiments, the vehicle detected occupancy number is determined based on one or more sensors outside the vehicle. In some embodiments, the vehicle detected occupancy number is determined based on deriving/extracting passenger information as gathered by the vehicle.

At block 1508, the on demand mobility partner compares the passenger reported occupancy number with the vehicle detected occupancy number. In response to the passenger reported occupancy number differing from the vehicle detected occupancy number, additional safety measures are taken. In some embodiments, the passenger reported occupancy number is greater than the vehicle reported occupancy number. In response to the passenger reported occupancy number being greater than the vehicle detected occupancy number, the on demand mobility partner may communicate with the passenger to ensure all passengers are in the vehicle. In response to the passenger reported occupancy number being greater than the vehicle detected occupancy number, the on demand mobility partner may communicate with the passenger to ensure the correct number of passengers are in the vehicle, are safe, and no unauthorized passengers have access to the vehicle. In an example, the passenger reported occupancy number being greater than the vehicle detected occupancy number can indicate passenger detection malfunctions within the AV and steps can be taken to remedy the malfunctions.

In some embodiments, the passenger reported occupancy number is less than the vehicle detected occupancy number. In response to the passenger reported occupancy number being less than the vehicle detected occupancy number, options for further assistance are provided. In examples, assistance is provided automatically in response to the passenger reported occupancy number being less than the vehicle detected occupancy number. In some embodiments, in response to the passenger reported occupancy number being less than the vehicle detected occupancy number, emergency services are notified. For example, if the vehicle detected additional passengers when compared to the expected number of passengers as reported by the passenger, authorities are notified that an unexpected and otherwise dangerous situation is possible in the vehicle.

At block 1510, in response to an indication from the on demand mobility partner the remote customer assistant initiates monitoring of the vehicle and determines if the passenger needs further assistance. For example, in response to the passenger reported occupancy number being less than the vehicle detected occupancy number, the remote customer assistant monitors the vehicle to determine if further assistance is required. In some embodiments, further assistance includes alerting emergency service providers. In some embodiments, further assistance includes clarification of passenger and trip details. In some embodiments, further assistance includes the addition of one or more passengers to the trip reservation.

The process flow diagram of FIG. 15 is not intended to indicate that the blocks of the example process 1500 are to be executed in any order, or that all of the blocks are to be included in every case. Further, any number of additional blocks not shown may be included within the example process 1500, depending on the details of the specific implementation.

According to some non-limiting embodiments or examples, provided is a method, comprising obtaining, using at least one processor, a reported number of passengers associated with on-demand mobility transportation services in response to passengers opting-in to a passenger support system. The method comprises comparing, using the at least one processor, the reported number of passengers with a vehicle detected number of passengers. Additionally, the method comprises enabling, using the at least one processor, a remote customer assistant in response to the reported number of passengers being unequal to the vehicle detected number of passengers.

According to some non-limiting embodiments or examples, provided is a system, comprising at least one processor and at least one non-transitory storage media storing instructions that, when executed by the at least one processor, cause the at least one processor to obtain a reported number of passengers associated with on-demand mobility transportation services in response to passengers opting-in to a passenger support system. The instructions cause the at least one processor to compare the reported number of passengers with a vehicle detected number of passengers. The instructions cause the at least one processor to enable a remote customer assistant in response to the reported number of passengers being unequal to the vehicle detected number of passengers.

According to some non-limiting embodiments or examples, provided is at least one non-transitory computer-readable medium comprising one or more instructions that, when executed by at least one processor, cause the at least one processor to obtain a reported number of passengers associated with on-demand mobility transportation services in response to passengers opting-in to a passenger support system. The instructions cause the at least one processor to compare the reported number of passengers with a vehicle detected number of passengers. The instructions cause the at least one processor to enable a remote customer assistant in response to the reported number of passengers being unequal to the vehicle detected number of passengers.

Clause 1: A method, comprising: obtaining, using at least one processor, a reported number of passengers associated with on-demand mobility transportation services in response to passengers opting-in to a passenger support system; comparing, using the at least one processor, the reported number of passengers with a vehicle detected number of passengers; and enabling, using the at least one processor, a remote customer assistant in response to the reported number of passengers being unequal to the vehicle detected number of passengers.

Clause 2: The method of clause 1, wherein the remote customer assistant monitors a cabin of the vehicle in response to the reported number of passengers being unequal to the vehicle detected number of passengers.

Clause 3: The method of any of the preceding clauses, wherein the remote customer assistant automatically notifies emergency services in response to the reported number of passengers being unequal to the vehicle detected number of passengers.

Clause 4: The method of any of the preceding clauses, comprising identifying an area as a safety risk based on a higher number of passengers opting in to the passenger support system in the area when compared to historical requests for the passenger support system in the area.

Clause 5: The method of any of the preceding clauses, wherein in response to the reported number of passengers being unequal to the vehicle detected number of passengers an unauthorized person within the vehicle is detected and the remote customer assistant strategically controls doors and windows of the vehicle to separate the passengers and unauthorized person.

Clause 6: The method of any of the preceding clauses, wherein the vehicle detected number of passengers is an occupancy number determined using at least one sensor located within the vehicle.

Clause 7: The method of any of the preceding clauses, wherein the remote customer assistant causes the vehicle to emit visual and auditory alerts in response to the reported number of passengers being unequal to the vehicle detected number of passengers.

Clause 8: A system, comprising: at least one processor, and at least one non-transitory storage media storing instructions that, when executed by the at least one processor, cause the at least one processor to: obtain a reported number of passengers associated with on-demand mobility transportation services in response to passengers opting-in to a passenger support system; compare the reported number of passengers with a vehicle detected number of passengers; and enable a remote customer assistant in response to the reported number of passengers being unequal to the vehicle detected number of passengers.

Clause 9: The system of clause 8, wherein the remote customer assistant monitors a cabin of the vehicle in response to the reported number of passengers being unequal to the vehicle detected number of passengers.

Clause 10: The system of any of the preceding clauses, wherein the remote customer assistant automatically notifies emergency services in response to the reported number of passengers being unequal to the vehicle detected number of passengers.

Clause 11: The system of any of the preceding clauses, comprising identifying an area as a safety risk based on a higher number of passengers opting in to the passenger support system in the area when compared to historical requests for the passenger support system in the area.

Clause 12: The system of any of the preceding clauses, wherein in response to the reported number of passengers being unequal to the vehicle detected number of passengers an unauthorized person within the vehicle is detected and the remote customer assistant strategically controls doors and windows of the vehicle to separate the passengers and unauthorized person.

Clause 13: The system of any of the preceding clauses, wherein the vehicle detected number of passengers is an occupancy number determined using at least one sensor located within the vehicle.

Clause 14: The system of any of the preceding clauses, wherein the remote customer assistant causes the vehicle to emit visual and auditory alerts in response to the reported number of passengers being unequal to the vehicle detected number of passengers.

Clause 15: At least one non-transitory storage media storing instructions that, when executed by at least one processor, cause the at least one processor to: obtain a reported number of passengers associated with on-demand mobility transportation services in response to passengers opting-in to a passenger support system; compare the reported number of passengers with a vehicle detected number of passengers; and enable a remote customer assistant in response to the reported number of passengers being unequal to the vehicle detected number of passengers.

Clause 16: The at least one non-transitory storage media of clause 15, wherein the remote customer assistant monitors a cabin of the vehicle in response to the reported number of passengers being unequal to the vehicle detected number of passengers.

Clause 17: The at least one non-transitory storage media of any of the preceding clauses, wherein the remote customer assistant automatically notifies emergency services in response to the reported number of passengers being unequal to the vehicle detected number of passengers.

Clause 18: The at least one non-transitory storage media of any of the preceding clauses, comprising identifying an area as a safety risk based on a higher number of passengers opting in to the passenger support system in the area when compared to historical requests for the passenger support system in the area.

Clause 19: The at least one non-transitory storage media of any of the preceding clauses, wherein in response to the reported number of passengers being unequal to the vehicle detected number of passengers an unauthorized person within the vehicle is detected and the remote customer assistant strategically controls doors and windows of the vehicle to separate the passengers and unauthorized person.

Clause 20: The at least one non-transitory storage media of any of the preceding clauses, wherein the vehicle detected number of passengers is an occupancy number determined using at least one sensor located within the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    obtaining, using at least one processor, a reported number of passengers associated with on-demand mobility transportation services in response to at least one passenger opting-in to a passenger support system, wherein an area is identified as a safety risk based on a number of passengers opting-in to the passenger support system in the area being greater than a number of historical requests to opt-in to the passenger support system in the area;
    comparing, using the at least one processor, the reported number of passengers with a vehicle detected number of passengers; and
    enabling, using the at least one processor, a remote customer assistant in response to the reported number of passengers being unequal to the vehicle detected number of passengers.

2. The method of claim 1, wherein the remote customer assistant monitors a cabin of the vehicle in response to the reported number of passengers being unequal to the vehicle detected number of passengers.

3. The method of claim 1, wherein the remote customer assistant automatically notifies emergency services in response to the reported number of passengers being unequal to the vehicle detected number of passengers.

4. The method of claim 1, wherein in response to the reported number of passengers being unequal to the vehicle detected number of passengers, doors are unlocked and windows are rolled down to enable views inside the vehicle.

5. The method of claim 1, wherein the vehicle detected number of passengers is an occupancy number determined using at least one sensor located within the vehicle.

6. The method of claim 1, wherein the remote customer assistant causes the vehicle to emit visual and auditory alerts in response to the reported number of passengers being unequal to the vehicle detected number of passengers.

7. The method of claim 1, wherein an on demand mobility cloud service obtains the reported number of passengers and the vehicle detected number of passengers, and the on demand mobility cloud service enables the remote customer assistant in response to the reported number of passengers being unequal to the vehicle detected number of passengers.

8. A system, comprising:
    at least one processor, and
    at least one non-transitory storage media storing instructions that, when executed by the at least one processor, cause the at least one processor to:
        obtain a reported number of passengers associated with on-demand mobility transportation services in response to at least one passenger opting-in to a passenger support system, wherein an area is identified as a safety risk based on a number of passengers opting-in to the passenger support system in the area being greater than a number of historical requests to opt-in to the passenger support system in the area;
        compare the reported number of passengers with a vehicle detected number of passengers; and
        enable a remote customer assistant in response to the reported number of passengers being unequal to the vehicle detected number of passengers.

9. The system of claim 8, wherein the remote customer assistant monitors a cabin of the vehicle in response to the reported number of passengers being unequal to the vehicle detected number of passengers.

10. The system of claim 8, wherein the remote customer assistant automatically notifies emergency services in response to the reported number of passengers being unequal to the vehicle detected number of passengers.

11. The system of claim 8, wherein in response to the reported number of passengers being unequal to the vehicle detected number of passengers, doors are unlocked and windows are rolled down to enable views inside the vehicle.

12. The system of claim 8, wherein the vehicle detected number of passengers is an occupancy number determined using at least one sensor located within the vehicle.

13. The system of claim 8, wherein the remote customer assistant causes the vehicle to emit visual and auditory alerts in response to the reported number of passengers being unequal to the vehicle detected number of passengers.

14. At least one non-transitory storage media storing instructions that, when executed by at least one processor, cause the at least one processor to:
 obtain a reported number of passengers associated with on-demand mobility transportation services in response to at least one passenger opting-in to a passenger support system, wherein an area is identified as a safety risk based on a number of passengers opting-in to the passenger support system in the area being greater than a number of historical requests to opt-in to the passenger support system in the area;
 compare the reported number of passengers with a vehicle detected number of passengers; and
 enable a remote customer assistant in response to the reported number of passengers being unequal to the vehicle detected number of passengers.

15. The at least one non-transitory storage media of claim 14, wherein the remote customer assistant monitors a cabin of the vehicle in response to the reported number of passengers being unequal to the vehicle detected number of passengers.

16. The at least one non-transitory storage media of claim 14, wherein the remote customer assistant automatically notifies emergency services in response to the reported number of passengers being unequal to the vehicle detected number of passengers.

17. The at least one non-transitory storage media of claim 14, wherein in response to the reported number of passengers being unequal to the vehicle detected number of passengers, doors are unlocked and windows are rolled down to enable views inside the vehicle.

18. The at least one non-transitory storage media of claim 14, wherein the vehicle detected number of passengers is an occupancy number determined using at least one sensor located within the vehicle.

* * * * *